US007325524B2

(12) United States Patent
Yang

(10) Patent No.: US 7,325,524 B2
(45) Date of Patent: Feb. 5, 2008

(54) IGNITION/FUEL INJECTION SYSTEM WITH AUXILIARY AND SEPARATION CHARGING POWER SOURCES

(76) Inventor: Tai-Her Yang, No. 59, Chung Hsing 8 St., Si-Hu Town, Dzan Hwa (TW)

( * ) Notice: Subject to any disclaimer, the term of this patent is extended or adjusted under 35 U.S.C. 154(b) by 0 days.

(21) Appl. No.: 11/047,732

(22) Filed: Feb. 2, 2005

(65) Prior Publication Data

US 2006/0169237 A1 Aug. 3, 2006

(51) Int. Cl.
*F02N 11/14* (2006.01)
*H02J 7/14* (2006.01)

(52) U.S. Cl. .................................. 123/179.28; 310/125

(58) Field of Classification Search ............. 123/179.1, 123/179.28, 179.5; 320/123, 125
See application file for complete search history.

(56) References Cited

U.S. PATENT DOCUMENTS 4,045,718 A * 8/1977 Gray .......................... 320/123
5,937,829 A * 8/1999 Endou ........................ 123/497
2003/0131816 A1* 7/2003 Yang ....................... 123/179.1

* cited by examiner

*Primary Examiner*—Hieu T. Vo
*Assistant Examiner*—Arnold Castro
(74) *Attorney, Agent, or Firm*—Rabin & Berdo, P.C.

(57) ABSTRACT

An ignition/fuel injection system adapted with an auxiliary power source to exclusively supply power needed for the operation of the system, and a separation charging power source to separate that from the batteries for starting the motor so to avoid affecting the normal start-up of an engine by the sudden drop of the working voltage of the ignition/fuel injection system while the voltage of the batteries significantly drops as greater amperage is required to start the motor during the start-up of the engine; or to provide normal working voltage to the ignition/fuel injection system to ensure of good ignition status in case of lower engine rpm and insufficient voltage of generator in case of an engine started manually without the installations of motor and batteries.

6 Claims, 2 Drawing Sheets

IGNITION/FUEL INJECTION SYSTEM WITH AUXILIARY AND SEPARATION CHARGING POWER SOURCES

BACKGROUND OF THE INVENTION (a) Field of the Invention

The present invention is related to an ignition/fuel injection system, and more particularly to one adapted with an auxiliary power source to exclusively supply power needed for the operation of the system, and a separation charging power source to separate that from the batteries for starting the motor so to avoid affecting the normal start-up of an engine by the sudden drop of the working voltage of the ignition/fuel injection system while the voltage of the batteries significantly drops as greater amperage is required to start the motor during the start-up of the engine.

In the application of an engine started manually without the installations of motor and batteries, this present invention provides normal working voltage to the ignition/fuel injection system to ensure of good ignition status in case of lower engine rpm upon starting the engine and insufficient voltage of generator.

(b) Description of the Prior Art

Conventionally, an ignition or fuel injection operation system shares the same power supplied by batteries with a motor to start the engine. Therefore, starting the engine is difficult due to the voltage drop (usually 25~40%) of the batteries as the greater amperage is required to start the motor to result in poor ignition or slower on and off rate of the fuel injection system.

SUMMARY OF THE INVENTION

The primary purpose of the present invention is to provide an ignition/fuel injection system provided with an auxiliary power source to supply power to the ignition/fuel injection system and a separation charging power source to separate that from the batteries for starting the motor so to avoid affecting the normal start-up of an engine by the sudden drop of the working voltage of the ignition/fuel injection system while the voltage of the batteries significantly drops as greater amperage is required to start the motor during the start-up of the engine.

Another purpose of the present invention is to provide an ignition/fuel injection system provided with an auxiliary power source to supply power to the ignition/fuel injection system and a separation charging power source for the application of an engine started manually without the installations of motor and batteries to supply normal working voltage to the ignition/fuel injection system to ensure of good ignition status in case of lower engine rpm upon starting the engine and insufficient voltage of generator.

DETAILED DESCRIPTION OF THE PREFERRED EMBODIMENTS

The present invention is related to an ignition/fuel injection system adapted with an auxiliary power source to exclusively supply power needed for the operation of the system, and a separation charging power source to separate that from the batteries for starting the motor so to avoid affecting the normal start-up of an engine by the sudden drop of the working voltage of the ignition/fuel injection system while the voltage of the batteries significantly drops as greater amperage is required to start the motor during the start-up of the engine.

In the application of an engine started manually without the installations of motor and batteries, this present invention provides normal working voltage to the ignition/fuel injection system to ensure of good ignition status in case of lower engine rpm upon starting the engine and insufficient voltage of generator.

Figure 1:
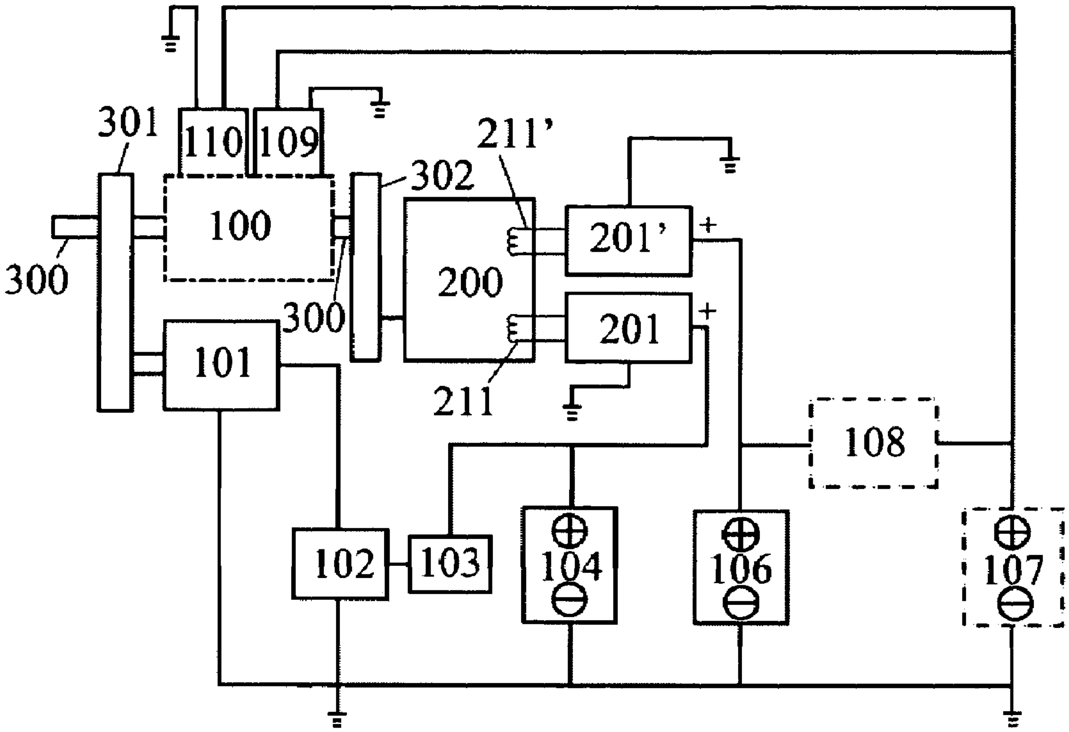
FIG. 1 is a block chart showing circuit of a preferred embodiment of the present invention.

Referring to FIG. 1 for a block chart of a circuit of a first preferred embodiment of the present invention. Wherein, an ignition/fuel injection system adapted with an auxiliary power source exclusively supplying power needed for the operation of the system, and a separation charging power source to separate that from the batteries for starting the motor essentially includes An engine unit 100: comprised of an internal combustion engine consuming fuel of diesel, gasoline, gas, or alcohol and adapted with a starting motor 101;

An engine shaft 300: for outputting rotation kinetics from the engine to drive a load, coupling to the starting motor 101 via a transmission 301, and coupling to a generator unit 200 via another transmission 302;

The starting motor 101: an optional item may be provided or may not be provided in case of the engine unit is started manually, related to a brush, brushless DC or VC motor, or a generator provided with the function as a motor, to control the batteries to drive the starting motor 101 by means of a starting motor relay 102 to further draw the engine unit 100 through the transmission 302;

A starting switch 103: related to a dynamo-electric switch device or a solid-state electronic switch device for controlling an ignition installation or a first auxiliary battery 106 of the ignition installation, or a fuel injection installation 110, or for direct control of the start motor or its relay 102, or any other vehicle-loaded electric installation;

A starting battery 104: comprised of any rechargeable second battery or super-capacitor, and can be omitted in case of an engine started manually;

A generator 200: comprised of an AC or DC generator directly drawn by the engine or through the transmission 302, containing two or more mutually insulated generation windings 211, 211' to respectively generate AC or rectified DC output, or to directly generate DC output, and only the generation winding 211' is required in the absence of the start motor and the starting battery when the engine is started manually;

An engine ignition installation 109: comprised of electro-mechanical circuit device or a solid-state electronic circuit device or a combination of both to ignite the internal combustion engine to operate the engine; and A fuel injection installation 110: containing an fuel injection mechanism to provide the function of the throttle by controlling the fuel injection gap, and a control circuit to control the fuel injection mechanism by referring to signals including that from the throttle openness, oil temperature, air intake temperature, and oxygen containment crankshaft (IP-ARB).

Either or both of the engine ignition installation 109 or the fuel injection installation 110 may be provided as applicable.

The ignition/fuel injection system adapted with a separate recharging and an auxiliary power sources is essentially characterized by that The first auxiliary battery 106 related to any rechargeable battery or super capacitor is provided to storage power generated by the engine driven generator winding 211' of the generator 200 or by an external charging installation. The power supplied by the first auxiliary battery 106 is segregated from that of the starting battery 104 by both mutually insulated generation windings 211, 211' installed in the generator 200. As required, a limit resistance 108 comprised of an optional series limit current induction type or resistance is provided at where between the first auxiliary battery 106 and the second rechargeable auxiliary battery 107 to limit the discharge by the first auxiliary battery 106 at the moment of ignition while the power supplied by the second auxiliary battery 107 is sufficient to discharge to the ignition installation 109 or drive the fuel injection installation 110, and later to be recharged by the first auxiliary batter 106 through the limit resistance 108 comprised of limit induction or resistance.

The second auxiliary battery 107 comprised of a rechargeable second battery or a super capacitor is provided to supply power to the engine ignition installation in time at the moment of ignition of the engine.

Two regulators 201, 201' are provided to respectively rectify or regulate the power outputted by both generation windings 211, 211' of the generator into that applicable to charge the starting battery 104, the first auxiliary battery 106, the second auxiliary battery 107, and any other load.

When the present invention is applied in the engine that is manually started without the installation of the start motor 101 and the starting battery 104, only the generation winding 211' and only the regulator 201' are provided to the generator 200 to charge both of the first and the second auxiliary batteries.

A device of higher energy density may be selected for the first auxiliary battery 106, and a device of higher power density may be selected for the second auxiliary batter 107 to compromise ignition performance and cost concerns.

In the first preferred embodiment of the present invention, the ignition installation 109 or the fuel injection installation 110 and the first auxiliary battery 106, the limit resistance 108, and the second auxiliary battery 107 may be segregated from one another or may share the common structure. Alternatively, the ignition installation 109 or the fuel injection installation 110 and either or both of the first and the second auxiliary batteries 106, 107 may be segregated from each other or may share the common structure.

Figure 2:
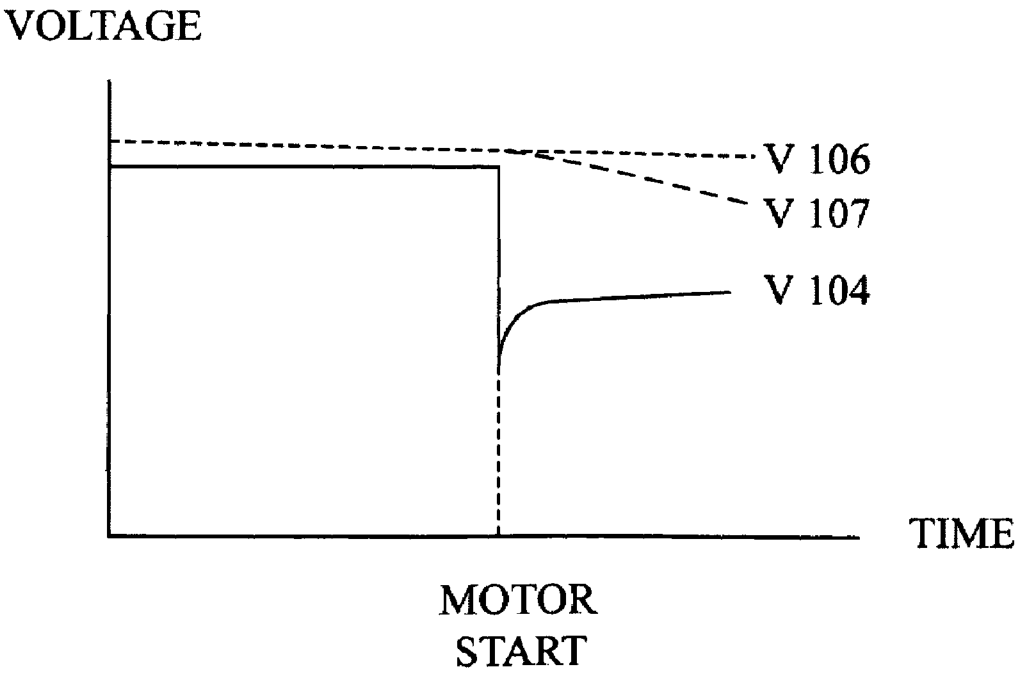
FIG. 2 is a schematic view showing the changes in voltage of batteries and upon starting a motor of the preferred embodiment of the present invention.

FIG. 2 is a schematic view of the changes in the battery voltage and in the motor when the motor is started in the first preferred embodiment. Wherein, V106 relates to a terminal voltage of the first auxiliary battery 106, V107 relates to a terminal voltage of the second auxiliary battery 107, and V104 relates to a terminal voltage of the starting battery 104.

Figure 3:
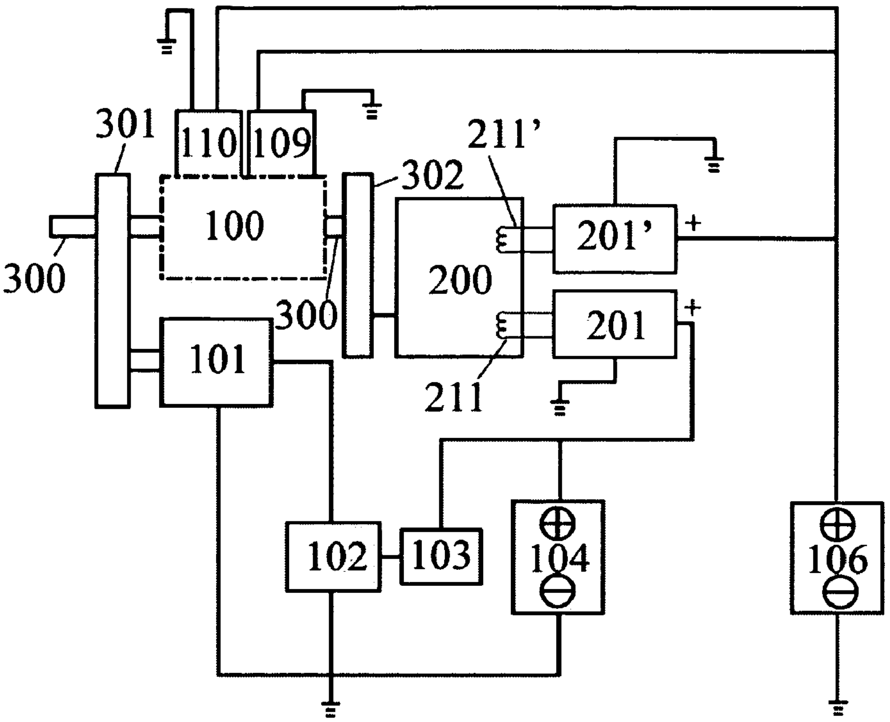
FIG. 3 is a block chart showing the circuit of a second preferred embodiment of the present invention with the omission of a second rechargeable auxiliary battery and a limit current resistance from the first preferred embodiment.

Now referring to FIG. 3 for a block chart of a circuit of a second preferred embodiment, the second auxiliary battery 107 and the limit resistance 108 of the first preferred embodiment are not provided. The regulator 201 controls and regulates the charging of the starting battery 104 by the generation winding 211 of the generator, and the regulator 201' controls and regulates the charging of the first auxiliary battery 106 by the generation winding 211 of the generator 200. The first auxiliary battery 106 supplies power to the ignition installation 109 or the fuel injection installation 110. When applied in the engine started manually without the installation of the start motor 101 and the starting battery 104, only the generation winding 211' and the regulator 201' are provided to charge the first auxiliary battery 106.

Figure 4:
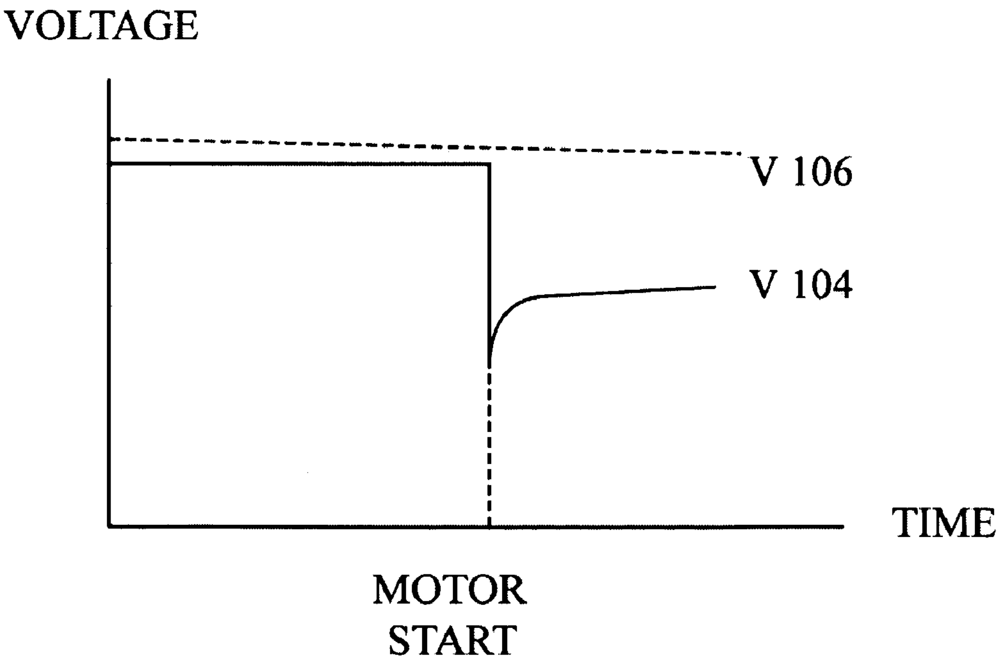
FIG. 4 is a schematic view showing the changes in voltage of batteries and upon starting a motor of the second preferred embodiment of the present invention.

As illustrated in FIG. 4 for a schematic view of changes in voltage of the battery and when the motor is started in the second preferred embodiment, V106 relates to the terminal voltage of the first auxiliary battery 106, and V104 relates to the terminal voltage of the starting battery 104.

In the second preferred embodiment as illustrated in FIG. 3, the ignition installation and the first auxiliary battery 106 of the ignition system or the fuel injection system adapted with the auxiliary and the separation charging power sources are either segregated from each other or sharing the common structure.

The present invention by providing an ignition/fuel injection system adapted with auxiliary and separation power sources to separate that from the batteries for starting the motor so to avoid affecting the normal start-up of an engine by the sudden drop of the working voltage of the ignition/fuel injection system while the voltage of the batteries significantly drops as greater amperage is required to start the motor during the start-up of the engine; or to provide normal working voltage to the ignition/fuel injection system to ensure of good ignition status in case of lower engine rpm upon starting the engine and insufficient voltage of generator in case of an engine started manually without the installations of motor and batteries is unique and provided with specific function. Therefore, this application is duly filed accordingly.

The invention claimed is:

1. A power source, comprising:

an engine (100);

a generator unit (200) having first and second generation windings (211, 211 ');

means connecting the engine (100) and the generator unit (200) for driving the generator unit (200);

a relay (102);

a starting switch (103);

a starting motor (101) for starting the engine;

a starting battery (104) that is charged by power from the first generation winding (211) of the generator unit, the starting battery (104) supplying power to the starting motor (101) through the relay (102) controlled by the starting switch (103);

a device selected from the group consisting of a fuel injection device (110) and an engine ignition device (109);

a first auxiliary battery (106) that is charged by power from the second generation winding (211') of the generator unit, the first auxiliary battery (106) supplying power to the device.

2. The power source of claim 1, further comprising a first regulator (201) connected between the first generation winding (211) of the generator unit and the starting battery (104).

3. The power source of claim 1, further comprising a second regulator (201') connected between the second generation winding (211') of the generator unit and the first auxiliary battery (106).

4. The power source of claim 1, further comprising a second auxiliary battery (107) and a limit impedance (108)

connected between the first auxiliary battery (106) and the second auxiliary battery (107).

5. The power source of claim 1, wherein the means connecting the engine (100) and the generator unit (200) comprises a transmission unit (302).

6. The power source of claim 1, further comprising a transmission unit (301) coupled between the starting motor (101) and the engine (100).

* * * * *